3,729,461
SYNTHESIS OF GLYCOSYL GLYCERIDES
Yeshajahu Pomeranz, Madison, Wis., and Hans Peter Wehrli, Zurich, Switzerland, assignors to the United States of America as represented by the Secretary of Agriculture
No Drawing. Filed Dec. 23, 1970, Ser. No. 101,135
Int. Cl. C07c 47/18
U.S. Cl. 260—210 R          6 Claims

ABSTRACT OF THE DISCLOSURE

A method for synthesizing glycosyl glycerides from 2,5-methylene-D-mannitol acetobromogalactose and fatty acid chlorides is described. Specific fatty acids are attached at specific glyceryl positions to give such compounds as 1-O-palmitoyl-2-O-linoleoyl - 3 - O-(β-D-galactopyranosyl)-sn-glycerol.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

The invention relates to some naturally occurring glycosyl glycerides, i.e., glycolipids containing fatty acid, glyceride, and glycoside moieties. More specifically, it relates to a method of synthesizing glycosyl glycerides having fatty acids attached specifically to either the 1-position or both the 1- and 2-positions of the glycerol moiety in which the optical activity at the 2-position is preserved.

The invention further relates to a shortened method of synthesizing glycosyl glycerides in which the optical activity at the 2-position of the glycerol moiety is lost.

Glycosyl glycerides are found extensively in nature (e.g., in grass seed, algae, gram positive bacteria, and animal tissues). Carter et al., J. Lipid Res. 2(3) 215 (1961), isolated a mono- and a digalactosyl glyceride from wheat flour and reported their structures as follows: (IUPAC–IUD nomenclature)

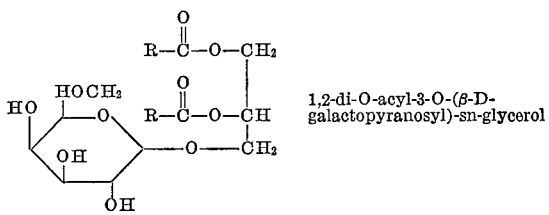

1,2-di-O-acyl-3-O-(β-D-galactopyranosyl)-sn-glycerol and

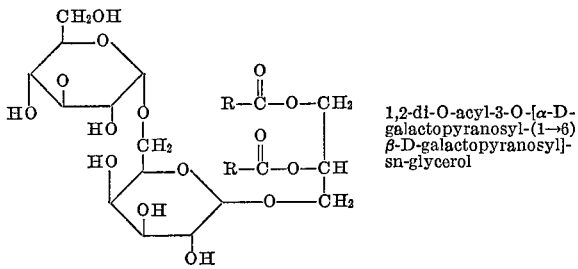

1,2-di-O-acyl-3-O-[α-D-galactopyranosyl-(1→6)
β-D-galactopyranosyl]-sn-glycerol

These galactosyl glycerides are useful for improving the breadmaking properties of dough, including dough that has been protein enriched.

Some glycolipids have been synthesized, e.g., phosphatidyl inositol (Davies and Malkin, Chem. Ind., Sept. 12, 1959, p. 1155), cytolipin [Shapiro and Rachaman, Nature 201, 878 (1964)], and glycolipids of the sucroester type (U.S. Pat. 2,893,990).

Wickberg [Acta Chem. Scand. 12, 1187 (1958)] synthesized the carbohydrates 1-O-α-D-, 1-O-β-D-, 3-O-α-D-, and 3-O-β-D-galactopyranosyl-sn-glycerol and compared them to the carbohydrate moieties of the natural glycosyl glyceride found in red algae from which the fatty acid moieties had been removed. The corresponding 3-O-[α-D-galactopyranosyl-(1→6)β - D - galactopyranosyl]-sn-glycerol was synthesized by Brundish et al. [Biochem, J. 105, 885 (1967)]. However, these carbohydrate products cannot be used as intermediates in the synthesis of galactosyl glycerides because it is impossible to esterify specifically the glycerol without esterifying the galactose hydroxyl groups.

In accordance with the invention we have discovered a method for synthesizing glycosyl glycerides comprising the following steps:

(a) condensing 1 mole of 2,5-methylene-D-mannitol with 2 moles of a fatty acid chloride to form 1,6-di-O-acyl-2,4-methylene-D-mannitol;

(b) reacting the product of step (a) with lead tetraacetate, filtering the reaction mixture, and adding sodium borohydride to the resulting filtrate to form 2,2'-O-methylene-bis-(1-O-acyl-sn-glycerol);

(c) condensing the product of step (b) with acetobromogalactose in the presence of mercuric oxide, mercuric bromide, and iodine and acidifying the resulting condensation products to form 1-O-acyl-3-O-(2,3,4,6-tetra-O-acetyl-β-D-galactopyranosyl)-sn-glycerol;

(d) reacting the product of step (c) with a second fatty acid chloride (which is either the same as or different than the one in step (a) above) to form 1,2-di-O-acyl-3-O - (2,3,4,6-tetra-O-acetyl-β-D-galactopyranosyl)-sn-glycerol; and (e) hydrazinolyzing the product of step (d) to form 1,2-di-O-acyl-3-O-(β-D-galactopyranosyl)-sn-glycerol.

We have also discovered a shortened method of preparing a racemic mixture of glycosyl glycerides comprising the following steps:

(a) condensing isopropylidene glycerol with acetobromogalactose or acetobromocellobiose in the presence of silver oxide and iodine to form 1,2-isopropylidene-3-O-(2,3,4,6-tetra - O - acetyl-β-D-galactopyranosyl)-rac-glycerol;

(b) acidifying the product of step (a) to remove the isopropylidene radical and condensing 1 mole of the resulting product with 2 moles of a fatty acid chloride such as octanoyl-, decanoyl-, lauroyl-linoleoyl chlorides or mixtures of the same to form 1,2-di-O-acyl-3-O-(2,3,4,6-tetra-O-acetyl-β-D-galactopyranosyl) - rac-glycerol; and (c) hydrazinolyzing the product of step (b) to form a glycosyl glyceride mixture consisting substantially of 1,2-di-O-acyl-3-O-(β-D-galactopyranosyl) - rac-glycerol and minor amounts of 1-, and 2-O-acyl-3-O-(β-D-galactopyranosyl)-rac-glycerol.

DETAILED DESCRIPTION OF THE INVENTION

The substantive purpose of the invention is to prepare glycosyl glycerides having specific fatty acids attached to the glycerol moiety and having specific structural configurations. In order to accomplish this purpose, the reaction schemes must be carried out in the proper order. The first step involves the reaction of a fatty acid chloride with 2,5-methylene-D-mannitol. Since the primary hydroxyl groups are most active, 1,6-di-O-acyl-2,5-methylene-D-mannitol is the major product. However, TLC (thin-layer chromatography) of the crude reaction product indicates that some reaction took place at the C-3 and C-4 positions of the 2,5-methylene-D-mannitol. In the second step, the diacyl-methylene-D-mannitols are cleaved between the C-3 and C-4 position by lead tetraacetate and, after filtering the reaction mixture, the resulting aldehydes in the filtrate are reduced by sodium borohydride.

The Koenig-Knor reaction is used in the third step to condense acetobromogalactose with the remaining hydroxy groups of the product resulting from the second step, 2,2' - O-methylene-bis-(1-O-acyl-sn-glycerol). The preferred reaction is carried out in the presence of mercury oxide, mercury bromide, and iodine at room temperature (25° C.) in the dark with chloroform as a solvent. The 2,2'-O-methylene bridge is easily broken in the presence of an acid preferably at a pH of about 1.5. However, hydrolysis of the glycoside bonds could not be completely prevented. The resulting mixture was repeatedly purified until TLC showed only a single component [i.e., 1 - O-acyl-3-O-(2,3,4,6-tetra-O-acetyl-$\beta$-D-galactopyranosyl)-sn-glycerol]. At this point there are two alternative steps: remove the acetyl groups to obtain a monoacyl product or condense the remaining glyceryl hydroxyl group with another fatty acid chloride followed by the removal of the acetyl group can be the same as the product. This second acyl group can be the same as the first or it can be different, thereby giving a way of producing essentially pure glycosyl glycerides having specific fatty acid groups attached at specific positions of the glycerol. The last step consists of removing the acetyl groups from the glycosyl moiety, but the most commonly used methods of achieving this would also greatly affect the fatty acid groups attached to the glycerol. Hydrazinolization was studied with various model compounds such as pentaacetyl glucose, octaacetylcellobiose, tripalmitoyl glycerol, and wheat flour galactolipids to determine the feasibility of using this method of removing acetyl groups. Temperatures of 0° to 78° C., reaction times of 5 minutes to 2 days, hydrazine concentrations of 1 to 100 moles per mole of acetyl groups, and several solvents that included 50 percent ethanol, 85 percent ethanol, and water-saturated butanol were used. The preferred conditions of 85 percent ethanol, 15 minutes boiling, and 2 moles hydrazine per acetyl group specifically removed the acetyl groups to give good yields of the desired products. In butanol, the fatty acid esters were hydrazinolyzed along with the acetyl groups, and in 50 percent ethanol the acetylated galactolipids were insoluble.

A shorter reaction scheme was also developed which acylates both glyceryl hydroxyl groups simultaneously. However, in this method the optical activity at the C-2 position of the glyceryl moiety is lost during the condensation of isopropylidene glycerol and acetobromogalactopyranosyl. This reaction is carried out preferably in the presence of silver oxide, iodine, and chloroform in the dark at room temperature. After the isopropylidene radical is removed, the resulting 3-O-(2,3,4,6-tetra-O-acetyl-$\beta$-D-galactopyranosyl)-rac-glycerol is acylated by condensing fatty acid chlorides to the two glyceryl hydroxyl groups in the presence of a small amount of quinoline. The problem of removing acetyl groups from the tetraacetyl-glycosyl portion of the molecule without affecting the fatty acid groups on the glyceryl portion was solved in the same manner as described in the first reaction scheme above. hydrazinolization gave a mixture of desired products which upon chromatographic purification yielded about a 6:1 ratio of 1,2-di-O-acyl-3-O-($\beta$-D-galactopyranosyl)-rac-glycerol to a mixture of 1- and 2-O-acyl-3-O-($\beta$-D-galactopyranosyl)-rac-glycerol.

EXAMPLE 1

Preparation of 1,2-di-O-palmitoyl-3-O-($\beta$-D-galactopyranosyl)-rac-glycerol (A) 13.2 grams (0.1 mole) of dry isopropylidene glycerol, 25.0 g. (0.11 mole) of fresh silver oxide, 100 g. of Drierite, and 100 ml. of anhydrous ethanol-free chloroform were placed in a 1-liter three-neck round-bottom flask equipped with a mechanical stirrer, a $CaCl_2$ drying tube, and dropping funnel. After stirring for 2 hours, 5 g. of iodine was added and 42.0 g. (0.1 mole) of acetobromogalactose in 120 ml. of dry ethanol-free chloroform was added dropwise during 30 minutes. Stirring was continued for 5 days at room temperature in the dark. The mixture was filtered, the residue was washed twice with chloroform, and the filtrate was evaporated in vacuo to an almost colorless syrup of crude product that could not be crystallized from methanol or ethyl ether. Comparison by TLC of the crude product with pure compounds indicated that the main product was 1,2-O-isopropylidene - 3 - O-(2,3,4,6-tetra-O-acetyl-$\beta$-D-galactopyranosyl)-rac-glycerol.

(B) 20.0 grams (0.043 mole) of the crude product of step (A) was dissolved in 100 ml. of hot 95 percent ethanol. After addition of 100 ml. of water, the suspension was adjusted to pH 2 with conc. hydrochloric acid. It was stirred for 30 minutes at 45°–50° C. and poured into 200 ml. ice-cold 10 percent sodium bicarbonate; 200 ml. chloroform was added and the organic layer was washed with water, dried over Drierite and evaporated to an almost colorless syrup. The product was purified by countercurrent distribution in separatory funnels using a benzene-water system. Ten benzene phases (each of 300 ml.) and 5 water phases (each of 150 ml.) were used. The desired compound was concentrated in the first 3 water phases; 2,3,4,6-tetra-O-acetyl-$\beta$-D-galactopyranose was distributed in all other phases. An unidentified product, probably O - $\beta$ - D-tetraacetylgalactopyranosyl-$\beta$-D-tetraacetylgalactopyranoside, remained in the last benzene layer. The product in the first 3 water phases was extracted several times with chloroform, dried with Drierite, and evaporated, yielding a colorless syrup of 8 g. (44 percent), that could not be crystallized. On TLC in benzene-methanol (100:6, v./v.) and chloroform-methanol (10:1, v./v.) only one spot was observed. The infrared spectrum showed a strong hydroxyl band at 3450 and a strong ester band at 1750 cm.$^{-1}$. The test for reducing sugars was negative. TLC of an acid hydrolyzate indicated the presence of galactose and glycerol.

(C) 2.0 grams (0.00474 mole) of the product of step (B) was dissolved in 10 ml. of dry ethanol-free chloroform. Then 4.4 g. (0.016 mole) of palmitoylchloride and 1.7 ml. of dried and freshly distilled quinoline were added. The mixture was shaken for 5 days at room temperature in the dark. After adding 100 ml. of dry ether, the content was washed twice with 70 ml. of ice-cold 0.5 N sulfuric acid, twice with 70 ml. of 10 percent sodium carbonate, once with 50 ml. of 5 percent sodium bicarbonate, and once with 70 ml. of water. The organic layer was dried over Drierite and evaporated in vacuo to a solid residue weighing 6.4 g. The residue was recrystallized 5 times from 50 ml. ethyl ether and was filtered each time at 0° C. The combined filtrates were evaporated to a solid residue (4.1 g., 84 percent) of a yellow product that gave a single spot on TLC with benzene-methanol (100:6, v./v.), or chloroform. The yellow color could not be removed by decolorizing carbon. Therefore, the product was recrystallized 10 times from 20 ml. methanol togive 2.0 g. (44 percent) of colorless 1,2 - di-O-palmitoyl - 3 - O-(2,3,4,6-tetra-O-acetyl-$\beta$-D-galactopyranosyl)-rac-glycerol. From the combined mother-liquors additional 1.5 g. crude product (M.P. 36°– 37° C.) could be recovered. The infrared spectrum had no hydroxyl band at 3450 cm.$^{-1}$. TLC of an acid hydrolyzate indicated the presence of glycerol, galactose, and fatty acid.

(D) to 1.5 g. (0.00167 mole) of the product of step (C), dissolved in 15 ml. of warm 85 percent ethanol, 15 ml. 85 percent ethanol containing 520 mg. (0.0165 mole) of hydrazine was added. After boiling under reflux for 20 minutes, the content was poured into 150 ml. ice-cold water, and extracted four times with 150 ml. of chloroform. The two layers were separated by centrifugation. The combined organic layers were dried over Drierite and evaporated to 600 mg. of a yellow syrup. The crude product was placed on a silicic acid column (25 x 5 cm.) and eluted with the following quantities of chloroform-methanol (v./v.):(100:2) 0 to 540 ml., (100:5) 540 to 1070 ml., and (100:10) 1070 to 2200 ml. The eluate was monitored by TLC. Fifty milligrams of an unidentified nonpolar lipid were eluted in the first 400 ml.; 310 mg. 1,2-di-O-palmitoyl-3-O-($\beta$-D-galactopyranosyl) - rac - glycerol were eluted at 400 to 540 mol.; 150 mg. of a mixture of mono- and diacyl compounds at 540 to 1150; 36 mg. pure monoacyl compounds [a mixture of 1- and 2-O-palmitoyl-3-O-($\beta$-D-galactopyranosyl)-rac-glycerol] at 1150 to 1600 ml.; and about 40 mg. of unidentified, highly polar products between 1600 to 2200 ml. The yields of pure diacyl and pure monoacyl mixture were 25 and 4.3 percent, respectively.

Analysis of the diacyl compound gave: M.P. 54.5°. Calculated: C, 67.44 percent; H, 10.71 percent. Found: C, 66.97 percent; H, 10.5 percent. Ester:galactose:glycerol=2:1.10:1.02. —$CH_2$— per mole (comparison of —$CH_2$— at 8.7$\tau$ with the corresponding amount of standard tripalmitin): 28.5 M.P. of deacetylated lipid (galactosylglycerol) 100°–110° $[\alpha]_D^{26}$ of galactosylglycerol 9°.

Analysis of the monoacyl mixture gave: M.P. 70°–75°. Calculated: C, 59.93 percent; H, 11.64 percent. Found: C, 59.02 percent; H, 10.81 percent. Ester:galactose:glycerol=1:0.92:0.90. —$CH_2$— per mole (comparison of —$CH_2$— at 8.7$\tau$ with the corresponding amount of tripalmitin): 11.2. M.P. of deacetylated lipid (galactosylglycerol) 100°–110°. $[\alpha]_D^{26}$ of galactosylglycerol 10°.

EXAMPLE 2

Preparation of 1,2-di-O-acyl-3-O-($\beta$-D-galactopyranosyl)-sn-glycerol (A) 13.0 grams (0.067 mole) of 2,5-methylene-D-mannitol were suspended in 150 ml. of ice-cold dry pyridine, and 36.7 g. (0.134 mole) of palmitoylchloride were added. After shaking at room temperature for 2 hours, the content was poured into 1 liter of ice water and the sticky yellow precipitate was filtered. The residue was recrystallized from 100 ml. of n-butanol, washed with methanol, and dried in vacuo. The yield of 1.6-di-O-palmitoyl-2,5-methylene-D-mannitrol was 13 g. (28 percent), M.P. 72°–80° C. (uncollected).

(B) 10.0 grams (0.015 mole) of the product of step (A) were dissolved in 100 ml. of dried, redistilled ethyl acetate, and cooled on an ice bath. Then, 6.7 g. (0.016 mole( of lead tetraacetate were added. After shaking for 5 minutes all the lead tetraacetate had reacted. Additional (about 3.0 g.) lead tetraacetate was added slowly until a small excess could be detected by a starch-iodine test and the color turned orange. The product was filtered; to the filtrate 0.80 g. of sodium borohydride was added and, after shaking for 30 minutes, the content was filtered. The precipitate was washed with 50 ml. of chloroform and the combined filtrate and washings were evaporated in vacuo yielding a residue of 8 g. (78 percent) of crude 2,2'-O-methylene-bis-(1-O-palmitoyl-n-glycerol) that was used in the next reaction without further purification.

(C) 6.0 grams (0.0090 mole) of the product of step (B) was dissolved in 40 ml. of dry ethanol-free chloroform. Fifteen grams of Drierite, 3.0 g. of mercury oxide, and 0.3 g. of mercury bromide were added. The mixture was mechanically stirred in a 500-ml. three-neck round-bottom flask for 2 hours at room temperature in the dark. To the mixture 2.3 g. of iodine were added and 9.0 g. (0.020 mole) of acetobromogalactose in 50 ml. of dry ethanol-free chloroform were dropped during 30 minutes into the flask. Stirring was continued in the dark for 6 days. Then the mixture was centrifuged and the residue washed twice with 50 ml. of chloroform. The combined supernatants were washed with water, dried over Drierite, and concentrated in vacuo to a syrup. The syrup was suspended in 90 ml. of water-saturated butanol. After heating to 45°–50° C., the suspension was adjusted with hydrochloric acid to pH 1.5 and stirred for 30 minutes at 45°–50° C. The suspension was poured into 200 ml. of chloroform-10 percent sodium bicarbonate (1:1, v./v.). The organic layer was washed twice with 20 ml. of water, dried over Drierite, and concentrated in vacuo at 60° C. to a syrup.

The syrup of crude 1-O-palmitoyl-3-O-(2,3,4,6-tetra-O-acetyl-$\beta$-D-galactopyranosyl)-sn-glycerol was fractionated in separatory funnels by countercurrent distribution in a system of water-petroleum ether (B.P. 60°–80° C.) benzene (3:2:1, v./v.) using 10 organic and 5 aqueous layers, each of 150 ml. As indicated by TLC (benzene-methanol, 100:6, v./v.), most of the product was in the last 3 organic phases. Those were combined, vaporated in vacuo, and extracted successively with petroleum ether (60°–80° C.) and water. The residue insoluble in both systems was dissolved in 20 ml. of chloroform, placed on a silicic acid column (20 x 5 cm.), and eluted with chloroform. The elution volume of the product was 400 to 850 ml. The eluate was evaporated in vacuo, redissolved in 50 ml. of methanol, and filtered after cooling to 0° C. The filtrate was evaporated in vacuo, redissolved in 5 ml. of benzene, and placed in a silicic acid column (20 x 5 cm.). It was eluted by a discontinuous gradient of benzene-methanol (0 to 800 ml., 800 to 2050 ml., and 2050 to 3700 ml. of 100:0, 100:3, and 100:6, respectively). Most product was eluted at 2250–2650 ml. This fraction was rechromatographed on the same column and eluted with benzene-methanol (100:6, v./v.) at 300 to 650 ml. That eluate was evaporated in vacuo to a solid residue of 0.9 g. (15 percent); M.P. 38°–40° C. The infrared spectrum showed a weak hydroxyl band at 3450, a strong C—H band at 2900, and a strong ester band at 1740 cm.$^{-1}$. Strong absorption in the range 1000 to 1400 cm.$^{-1}$ indicated a high content of polar groups. TLC (benzene:methanol, 100:6, v./v.) showed a single component.

(D) 500 milligrams (0.76 mole) of the product of step (C) was dissolved in 5 ml. of dry ethanol-free chloroform, and 0.17 ml. of dried, distilled quinoline and 400 mg. (1.5 mmole) of palmitoylchloride were added. After shaking for 1 week at room temperature in the dark, the product was isolated as described for the product of Example 1, step (C) 200 milligrams (29 percent) of colorless 1,2 - di - O-palmitoyl-3-O-(2,3,4,6-tetra-O-acetyl-$\beta$-D-galactopyranosyl)-sn-glycerol, M.P. 37° C., was obtained.

(E) The product of step (D) was treated in the same manner as the corresponding compound in Example 1, step (D). A 30 percent yield of 1,2-di-O-palmitoyl-3-O-($\beta$-D-galactopyranosyl)-sn-glycerol, M.P. 56° C., was obtained which analyzed: ester:galactose:glycerol =2:1.05: 1.08. M.P. of deacetylated galactosyl glycerol=135°–138° C. $[\alpha]_D^{26}$=0°.

EXAMPLE 3

The product from Example 2, step (C) (200 mg.) was reacted with 150 mg. of linoleoyl chloride as described in Example 2, step (D). The yield of yellow syrup, not recrystallized from methanol, was 150 mg. (55 percent). The $R_f$ value of the product, 1-O-palmitoyl-2-linoleoyl-3-O-(2,3,4,6-tetra-O-acetyl-$\beta$-D-galactopyranosyl)-sn - glycerol, was same as for the product of Example 2, step (D). The above product was treated in the same manner as the corresponding compound in Example 1, step (D) to yield 25 percent of 1-O-palmitoyl-2-linoleoyl-3-O-($\beta$-D-galactopyranosyl) - sn - glycerol. The molar ratio palmitic:linoleic acid was 1.00:0.93.

EXAMPLE 4

The product of Example 1, step (B) was reacted with each of the following (octanoyl, decanoyl, lauroyl, and linoleoyl chlorides) in the same manner as the corresponding compounds in Example 1, step (C) except that recrystallization of the products was omitted. The products were then reacted with hydrazine as described in Example 1, step (D).

The dioctanoyl, didecanoyl, dilauroyl, and dilinoleoyl derivatives are sticky syrups with viscosities increasing in the above order. The stearoyl derivative has a M.P. of 60° to 65° C. Yields decrease with increasing chainlength of the fatty acid. The shorter the fatty acid, the higher the percentage of the monoacyl derivatives as demonstrated by TLC with chloroform-methanol.

EXAMPLE 5

1,2-di-O-acyl-3-O-($\beta$-D-cellobiosyl) - rac - glycerol was synthesized the same way as the corresponding galactosyl derivatives in Example 1 but using acetobromocellobiose and octanoyl-, decanoyl-, lauroyl-, palmitoyl-, linoleoyl-, and stearoyl-chlorides as substrates. Recrystallized of the intermediate heptaacetylcellobiosyl glycerides was omitted. All end products were twice chromatographed on silicic acid columns using a chloroform-methanol gradient (100:0 to 100:10) for elution. The yields were similar to those of the corresponding galactopyranosyl analogues. The M.P. ranges were 60°–68° C. for octanoyl, 70°–75° C. for decanoyl, 80°–85° C. for lauroyl, 82°–85° C. for palmitoyl, and 65°–75° C. for the distearoyl derivatives. The linoleoyl derivative was a solid syrup. The infrared spectra were not significantly different from those of galactosyl glycerides.

We claim:

1. A method for synthesizing glycosyl glycerides comprising:
    (a) condensing 1 mole of 2,5-methylene-D-mannitol with 2 moles of a first straight chain fatty acid chloride having from about 8 to 18 carbon atoms to form 1,6-di-O-acyl-2,5-methylene-D-mannitol;
    (b) reacting said 1,6-di-O-acyl-2,5-methylene-D-mannitol with lead tetraacetate, filtering the reaction mixture, and adding sodium borohydride to the resulting filtrate to form 2,2'-O-methylene-bis-(1-O-acyl-sn-glycerol);
    (c) condensing said 2,2'-O-methylene-bis-(1-O-acyl-sn-glycerol) with acetobromogalactose in the presence of mercuric oxide, mercuric bromide, and iodine, and acidifying the resulting condensation products to form 1-O-acyl-3-O-(2,3,4,6-tetra-O-acetyl-$\beta$-D-galactopyranosyl)-sn-glycerol;
    (d) reacting said 1-O-acyl-3-O-(2,3,4,6-tetra-O-acetyl-$\beta$-D-galactopyranosyl)-sn-glycerol with a second straight chain fatty acid chloride having from about 8 to 18 carbon atoms to form 1,2-di-O-acyl-3-O-(2,3,4,6-tetra - O - acetyl-$\beta$-D-galactopyranosyl)-sn-glycerol; and
    (e) reacting said 1,2-di-O-acyl-3-O-(2,3,4,6-tetra-O-acetyl-$\beta$-D-galactopyranosyl)-sn-glycerol with hydrazine in the presence of water and an alcohol selected from the group consisting of ethanol and butanol to form 1,2-di-O-acyl-3-O-($\beta$-D-galactopyranosyl)-sn-glycerol.

2. A method for synthesizing glycosyl glycerides as described in claim 1 in which said first and second fatty acid chlorides are the same.

3. A method for synthesizing glycosyl glycerides as described in claim 1 in which said first and second fatty acid chlorides are different.

4. A method of synthesizing glycosyl glycerides comprising:
    (a) condensing isopropylidene glycerol with a member of the group consisting of acetobromocellobiose and acetobromogalactose in the presence of silver oxide and iodine to form a condensation product 1,2-O-isopropylidene - 3 - O - (2,3,4,6-tetra-O-acetyl-$\beta$-D-glycosyl)-rac-glycerol;
    (b) acidifying said condensation product to remove the isopropylidene radical bound thereto and condensing 1 mole of the resulting 3-O-(2,3,4,6-tetra-O-acetyl-$\beta$-D-glycosyl)-rac-glycerol with 2 moles of a straight chain fatty acid chloride having from about 8 to 18 carbon atoms to form a fatty acid condensation product 1,2 - di - O - acyl-3-O-(2,3,4,6-tetra-O-acetyl-$\beta$-D-glycosyl)-rac-glycerol; and
    (c) reacting said fatty acid condensation product with hydrazine in the presence of water and an alcohol selected from the group consisting of ethanol and butanol to form a glycosyl glyceride mixture consisting substantially of 1,2-di-O-acyl-3-O-($\beta$-D-glycosyl)-rac-glycerol and minor amounts of 1- and 2-O-acyl-3-O-($\beta$-D-glycosyl)-rac-glycerol.

5. A method for synthesizing glycosyl glycerides as described in claim 4 in which isopropylidene is condensed with acetobromogalactose in the presence of silver oxide and iodine to form a condensation product 1,2-O-isopropylidene - 3 - O - (2,3,4,6-tetra-O-acetyl-$\beta$-D-galactopyranosyl)-rac-glycerol.

6. A method for synthesizing glycosyl glycerides as described in claim 4 in which isopropylidene is condensed with acetobromocellobiose in the presence of silver oxide and iodine to form 1,2-O-isopropylidene-3-O-(2,3,4,6-tetra-O-acetyl-$\beta$-D-cellobiosyl)-rac-glycerol.

References Cited

UNITED STATES PATENTS 2,407,002  9/1946  Griffin _____ 260—210 R
2,931,797  4/1960  Gibbons et al. _____ 260—210 R LEWIS GOTTS, Primary Examiner J. R. BROWN, Assistant Examiner